United States Patent
Miyata et al.

(10) Patent No.: US 7,817,374 B2
(45) Date of Patent: Oct. 19, 2010

(54) THIN FILM DEVICE WITH LEAD CONDUCTOR FILM OF INCREASED SURFACE AREA

(75) Inventors: Shingo Miyata, Tokyo (JP); Atsushi Yamaguchi, Tokyo (JP); Kiyoshi Noguchi, Tokyo (JP); Makoto Sato, Tokyo (JP)

(73) Assignee: TDK Corporation, Tokyo (JP)

( * ) Notice: Subject to any disclaimer, the term of this patent is extended or adjusted under 35 U.S.C. 154(b) by 718 days.

(21) Appl. No.: 11/742,788

(22) Filed: May 1, 2007

(65) Prior Publication Data
US 2008/0274379 A1 Nov. 6, 2008

(51) Int. Cl.
*G11B 5/17* (2006.01)
(52) U.S. Cl. .................................. 360/123.33
(58) Field of Classification Search ............ 360/123.57, 360/123.01, 123.11, 123.1, 123.17, 123.36, 360/123.56, 123.25, 123.33, 123.09, 123.35, 360/123.4, 123.42, 123.46, 123.54, 234.5, 360/110, 234.4
See application file for complete search history.

(56) References Cited

U.S. PATENT DOCUMENTS

| | | | | |
|---|---|---|---|---|
| 4,684,438 A * | 8/1987 | Lazzari | ...................... | 216/22 |
| 5,461,528 A * | 10/1995 | Keel et al. | .............. | 360/123.01 |
| 6,466,401 B1 * | 10/2002 | Hong et al. | ............ | 360/123.25 |
| 6,570,743 B1 * | 5/2003 | Garfunkel et al. | ........... | 360/322 |
| 6,678,942 B1 * | 1/2004 | Sasaki | ..................... | 29/603.25 |
| 6,950,279 B2 * | 9/2005 | Sasaki et al. | ............. | 360/125.5 |
| 6,980,395 B2 * | 12/2005 | Lille | ........................ | 360/123.2 |
| 2004/0240106 A1 * | 12/2004 | Iitsuka et al. | ................ | 360/123 |
| 2007/0195457 A1 | 8/2007 | Matono et al. | ......... | 360/123.24 |
| 2007/0211391 A1 | 9/2007 | Hirata et al. | ................ | 360/319 |

FOREIGN PATENT DOCUMENTS

| | | |
|---|---|---|
| JP | 6-21409 | 1/1994 |
| JP | 6-302640 | 10/1994 |
| JP | 9-54910 | 2/1997 |
| JP | 10-296525 | 11/1998 |
| JP | 11-25421 | 1/1999 |
| JP | 2000-48315 | 2/2000 |
| JP | 2000-48319 | 2/2000 |
| JP | 2001-126216 | 5/2001 |
| JP | 2002-157704 | 5/2002 |
| JP | 2005-18866 | 1/2005 |
| JP | 2005-72250 | 3/2005 |
| JP | 2007-242786 | 9/2007 |
| JP | 2007-257815 | 10/2007 |

* cited by examiner

*Primary Examiner*—Julie Anne Watko
(74) *Attorney, Agent, or Firm*—Oblon, Spivak, McClelland, Maier & Neustadt, L.L.P.

(57) ABSTRACT

The present invention relates to a thin-film device including a thin-film element and a lead conductor film. The thin-film element and the lead conductor film are embedded in an insulating film. The lead conductor film has a terminal area at one end thereof, is connected to the thin-film element at the other end thereof, and between the one end and the other end, has an increased surface area portion whose volume is partially occupied by an insulating material to increase surface area. As a result, there is provided a high frequency thin-film device capable of reducing loss and heat generation due to skin effect, particularly a thin-film magnetic head.

28 Claims, 15 Drawing Sheets

THIN FILM DEVICE WITH LEAD CONDUCTOR FILM OF INCREASED SURFACE AREA

TECHNICAL FIELD

The present invention relates to a thin-film device, a thin-film magnetic head, a head assembly and a magnetic recording/reproducing apparatus.

BACKGROUND OF THE INVENTION

Thin-film devices covered by the present invention include a magneto-resistive effect element (hereinafter referred to as "MR element"), a variety of semiconductor elements and a circuit element such as an inductor. Among them, the MR element is used not only as a magnetic detecting element or a magnetic memory but also as a reproducing element for a thin-film magnetic head. The inductor forms an independent circuit element by itself and is also used as a recording element for a thin-film magnetic head.

In thin-film devices of this type, since the signal frequency has been increased for higher speed and performance, the ensuing increase in loss and heat generation due to the skin effect that a signal current flows at the surface of a lead conductor film in a concentrated manner has become a problem. As a measure against the skin effect in association with the increased frequency, for example, Japanese Unexamined Patent Application Publication No. 1106-302640 discloses a bonding wire, while Japanese Unexamined Patent Application Publication No. 2000-48315 discloses an inductive element.

In thin-film devices of this type, however, there is generally adopted a structure in which a thin-film element and a lead conductor film are embedded in an insulating film, and such a structure requires a system through which heat generated at the lead conductor film by the skin effect in association with the increased signal frequency can be conducted out of the insulating film for radiation of heat, so that it is difficult to efficiently radiate heat.

If it is possible to increase the sectional area of the lead conductor film, the surface area will also increase accordingly, relieving the problem due to the skin effect, but since further miniaturization of the lead conductor film and the thin-film element is required for miniaturization of the thin-film device, as well as for higher speed and performance, the above measures cannot be adopted.

SUMMARY OF THE INVENTION

It is an object of the present invention to provide a high frequency thin-film device capable of reducing loss and heat generation due to skin effect, particularly a thin-film magnetic head, a head assembly using the thin-film magnetic head, and also a magnetic recording/reproducing apparatus such as a magnetic disk device.

1. Thin-Film Device

To achieve the above object, a thin-film device according to the present invention includes a lead conductor film having a terminal area at one end thereof and being connected to the thin-film element at the other end thereof, wherein between the one end and the other end, the lead conductor film has an increased surface area portion whose volume is partially occupied by an insulating material to increase surface area.

Since the surface area of the lead conductor film is increased at the increased surface area portion, even if the skin effect increases with an increase in frequency of a signal current and the high frequency signal current flows in a concentrated manner at the surface of the lead conductor film, the increased surface area portion enables the high frequency signal current to flow in a widely distributed manner over the enlarged surface, thereby reducing the current density. This reduces the loss and heat generation due to the skin effect.

In the present invention, the increase in surface area of the lead conductor film is achieved such that an insulating material occupies a part of the volume, which should have been occupied by the lead conductor film. That is, unlike the technique of increasing the sectional area of the lead conductor film for increasing the surface area thereof, it is configured by replacing a part of the volume to be occupied by the lead conductor film with an insulating material. According to the present invention, therefore, the loss and heat generation due to the skin effect can be reduced even in a thin-film device in which a considerably fine pattern is required for the lead conductor film and the thin-film element.

The increase in surface area, which is achieved such that an insulating material partially occupies the volume of the lead conductor film, is mainly obtained by the area of the inner periphery of the lead conductor film in contact with the outer periphery of the insulating material. The area of the inner periphery of the lead conductor film depends on the film thickness and circumference of the lead conductor film. Here, the plane area of the lead conductor film may decrease depending on the arrangement of the insulating material. Even in this case, the surface area can be increased by setting the film thickness and circumference of the lead conductor film such that the resulting increase in area is larger than the decrease in plane area of the lead conductor film due to the presence of the insulating film.

The structure which enables the increase in surface area has two possible embodiments corresponding to electric current directions. One embodiment corresponds to a case where the electric current direction is perpendicular to a film surface of the lead conductor film. Its typical example is a via-hole conductor extending along the film thickness of an insulating film. In this case, the insulating material may be embedded in the lead conductor film such that the lead conductor film surrounds the insulating material. At the lead conductor film surrounding the insulating material, the high frequency current flows in a direction perpendicular to the film surface, i.e., in a longitudinal direction.

Another embodiment corresponds to a case where the electric current direction is parallel to the film surface and the lead conductor film is shunted. In this case, more specifically, the increased surface area portion may be provided by forming parallel shunts with an insulating material embedded in a planar lead conductor film. The above two embodiments may be employed alone or in combination with each other.

The thin-film device according to the present invention includes a MR element, a variety of semiconductor elements and a circuit element such as an inductor. Among them, for example, in the case of a write element of a thin-film magnetic head or an independent inductor, both ends of a coil film are connected to the lead conductor film according to the present invention. This realizes an inductor which can reduce the loss and heat generation due to the skin effect at the lead conductor film.

In addition, the present invention is applicable to the coil film itself. This enables reduction of the loss and heat generation due to the skin effect not only for the lead conductor film but also for the coil film.

More specifically, the coil film may include a plurality of coil films separated from each other by an insulating film. In more detail, the plurality of coil films and the insulating film may be disposed on a common plane and the plurality of coil films may be separated from each other by the insulating film on the common plane.

When the coil film is used for a thin-film magnetic head or the like, moreover, the coil film usually has an increased width portion rather than having a constant width over the entire length. In this case, accordingly, the increased surface area portion may be formed such that the increased width portion is partially occupied by the insulating film.

Also in a case of including a MR element as the thin-film element, the present invention is applicable to its lead conductor film.

2. Thin-Film Magnetic Head

A thin-film magnetic head according to the present invention is a typical example of the above thin-film device. The thin-film magnetic head includes a slider, at least one electromagnetic conversion element and a lead conductor film. The electromagnetic conversion element is supported by the slider.

To the lead conductor film, the technical features described with respect to the above thin-film device are applicable as they are. Accordingly, the effects and advantages described with respect to the thin-film device are also true for the thin-film magnetic head.

In the thin-film magnetic head, the thin-film element is formed by an electromagnetic conversion element. The electromagnetic conversion element includes a recording element and a reproducing element. As the recording element, there may be employed not only a longitudinal recoding element but also a perpendicular recording element that is now becoming mainstream. As the reproducing element, for example, there may be employed a giant magneto-resistive effect (GMR) or a tunneling magneto-resistive effect (TMR).

3. Head Assembly and Magnetic Recording/Reproducing Apparatus

The present invention also discloses a head assembly and a magnetic recording/reproducing apparatus using the above thin-film magnetic head. The head assembly includes the above thin-film magnetic head and a head support device. The head support device supports the thin-film magnetic head in such a manner as to permit rolling and pitching of the thin-film magnetic head. In the present invention, examples of the head assembly include an HGA (head gimbal assembly) in which the thin-film magnetic head is mounted on a head support device (or gimbal) and an HAA (head arm assembly) in which the HGA is mounted on an arm.

The magnetic recording/reproducing apparatus according to the present invention includes the above head assembly and a magnetic recording medium. A typical example of the magnetic recording/reproducing apparatus is a hard disk drive (HDD) using a magnetic recording medium called "hard disk".

The other objects, constructions and advantages of the present invention will be further detailed below with reference to the attached drawings. However, the attached drawings show only illustrative examples.

DESCRIPTION OF THE PREFERRED EMBODIMENTS

1. Thin-Film Device

Figure 1:
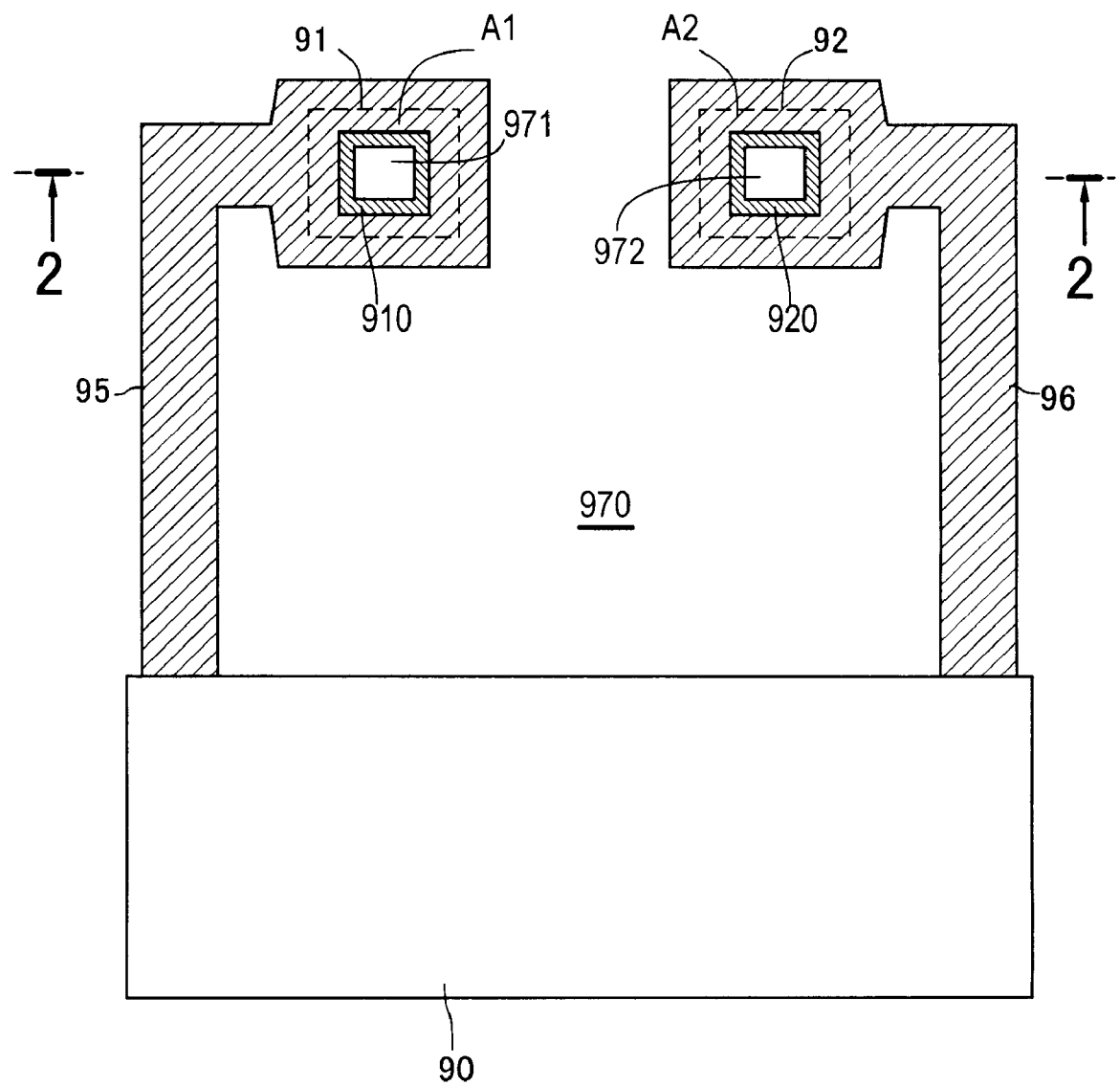
FIG. 1 is a plan view of a thin-film device according to the present invention.
Figure 2:
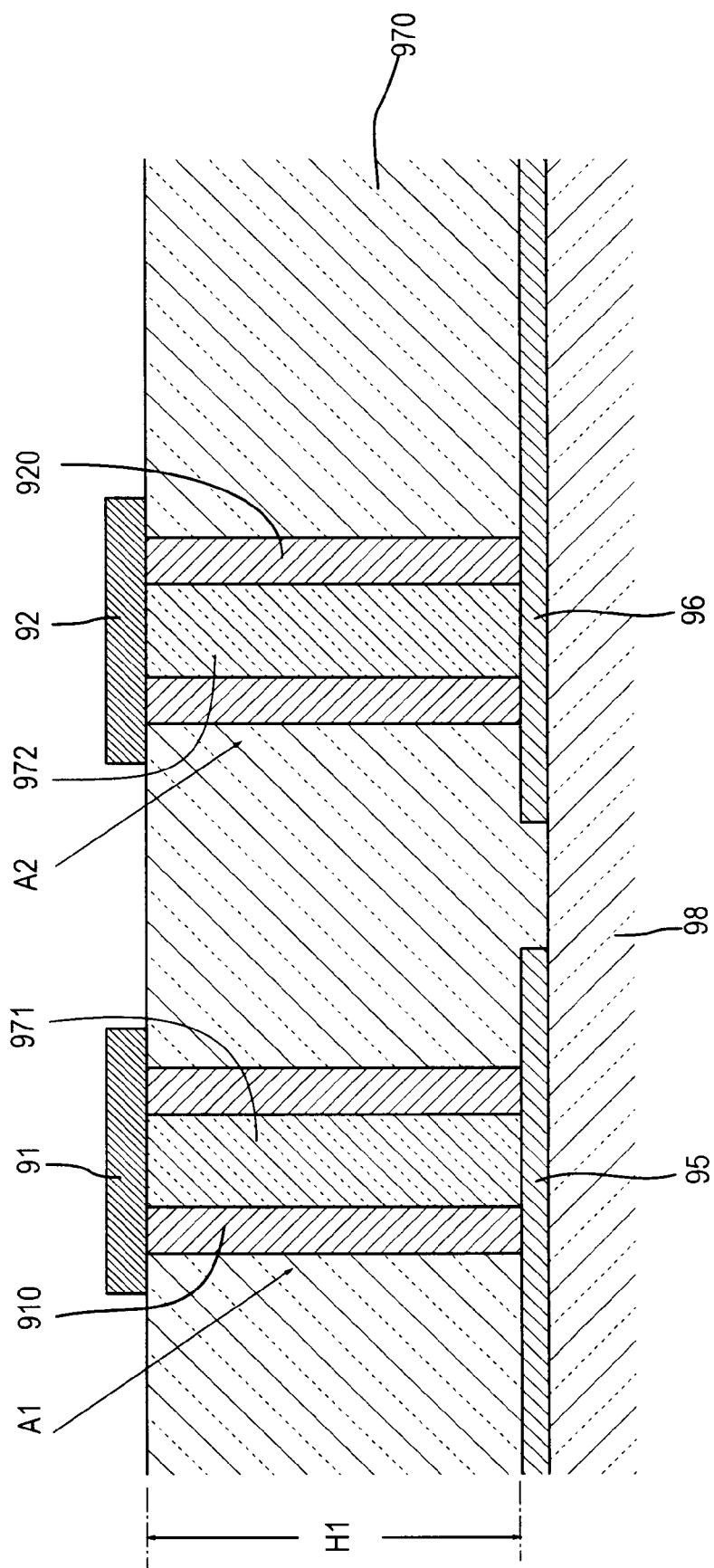
FIG. 2 is a sectional view taken along line 2-2 in FIG. 1.

A thin-film device illustrated in FIGS. 1 and 2 includes a thin-film element 90, a lead conductor film (95, 910), a lead conductor film (96, 920), and bumps 91, 92.

The thin-film element 90 is in the form of a thin-film and at least one selected from an electromagnetic conversion element, a passive element and an active element. More specifically, examples include a MR element, a recording element, a memory element for use in a MRAM (magnetoresistive random access memory), a magnetic sensor element, a coil element, a resistive element, and a capacitor element. They may be used alone or in combination with each other. The thin-film magnetic head is a typical example of a case where a MR element is combined with a coil element. The MR element may include a SV film or a TMR film. The thin-film device according to the present invention may be an assembly of an array of thin-film elements 90 or may be an individual body.

The lead conductor film (95, 910) and the lead conductor film (96, 920) contain Cu as a main component and are connected to the thin-film element 90. Although two lead conductor films (95, 910), (96, 920) are illustrated in the drawings, the number is arbitrary. Of the two, one lead conductor film (95, 910) has a planar conductor portion 95 and a projecting conductor portion 910 and is embedded in an insulating film 970 on one surface of an insulating support film 98 except one end face of the projecting conductor portion 910. The projecting conductor portion 910 is a kind of via-hole conductor and typically formed by a Cu plated film projecting from the planar conductor portion 95 with its one end face substantially flush with the surface of the insulating film 970.

The other lead conductor film (96, 920) also has a planar conductor portion 96 and a projecting conductor portion 920, which is a kind of via-hole conductor, and is embedded in the insulating film 970 on one surface of the insulating support film 98 except one end face of the projecting conductor portion 920. The projecting conductor portion 920 is a Cu plated film projecting from the planar conductor portion 96 with its one end face substantially flush with the surface of the insulating film 970.

The bumps 91, 92 are portions to which an outer conductor such as a wire is to be connected and their surface is formed by an Au plated film or the like.

The insulating film 970 is generally formed by a ceramic film such as of $Al_2O_3$. In this case, the one end faces of the projecting conductor portions 910, 920 and the surface of the insulating film 970 preferably constitute a polished surface obtained by polishing them flush with each other.

In the above structure, the lead conductor film (95, 910) and the lead conductor film (96, 920) have increased surface area portions A1, A2 between one end connected to the thin-film element 90 and the other end disposed with the bumps 91, 92. In the embodiment illustrated in FIGS. 1 and 2, the increased surface area portions A1, A2 are formed with insulating materials 971, 972 embedded in the projecting conductor portions 910, 920 such that the projecting conductor portions 910, 920 surround the insulating materials 971, 972. Accordingly, the surface area of the conductor film increases at the projecting conductor portions 910, 920 by an amount corresponding to the contact area between the insulating materials 971, 972 and the conductor film forming the projecting conductor portions 910, 920.

With the above structure, since the surface area of the projecting conductor portions 910, 920 is increased at the increased surface area portions A1, A2, even if a high frequency signal current flows in a concentrated manner at the surface of the projecting conductor portions 910, 920 because of the skin effect, the increased surface area portions A1, A2 enable the high frequency signal current to flow in a widely distributed manner over the enlarged surface, thereby reducing the current density. This reduces the loss and heat generation due to the skin effect.

The increase in surface area of the projecting conductor portions 910, 920 is achieved such that the insulating materials 971, 972 occupy a part of the volume, which should have been occupied by the conductor film forming the projecting conductor portions 910, 920. That is, they are configured by replacing a part of the volume to be occupied by the conductor film forming the projecting conductor portions 910, 920 with the insulating materials 971, 972. This is unlike the technique of increasing the sectional area of the lead conductor film for increasing the surface area thereof. According to the present invention, therefore, the loss and heat generation due to the skin effect can be reduced even in a thin-film device that requires a considerably fine pattern.

The increase in surface area, which is achieved such that the insulating materials 971, 972 partially occupy the volume of the conductor film forming the projecting conductor portions 910, 920, is mainly obtained by the area of the inner periphery of the projecting conductor portions 910, 920 in contact with the outer periphery of the insulating materials 971, 972. The area of the inner periphery of the projecting conductor portions 910, 920 depends on a film thickness H1, which is taken along the longitudinal direction in the drawing, and a circumference thereof. Here, the insulating materials 971, 972 have a plane area which occupies a part of the plane area of the lead conductor film conventionally forming the projecting conductor portions 910, 920. Even in this case, the surface area can be increased by setting the film thickness H1 and circumference of the projecting conductor portions 910, 920 such that the resulting increase in area is larger than the decrease in plane area of the lead conductor film due to the presence of the insulating films 971, 972.

Although the loss and heat generation due to the skin effect can be reduced as described above, it is impossible to eliminate the skin effect itself.

Accordingly, as means for preventing thermal deformation due to heat generated at such a reduced level, the insulating materials 971, 972 are preferably made of a high-modulus material such as $SiO_2$, specifically, $SiO_2$ with rutile structure. For the purpose of efficiently radiating the generated heat, it is also effective that the insulating materials 971, 972 are made of an insulating material having good thermal conductivity such as SiC, $Si_3N_4$ and MgO.

The structure which enables the increase in surface area has two possible embodiments corresponding to electric current directions. One embodiment corresponds to a case where the electric current direction is perpendicular to a film surface of the lead conductor film. The embodiment illustrated in FIGS. 1 and 2 is its typical example. In this case, the high frequency current flows in a direction perpendicular to the film surface, i.e., in a longitudinal direction, at the projecting conductor portions 910, 920 surrounding the insulating materials 971, 972.

Figure 3:
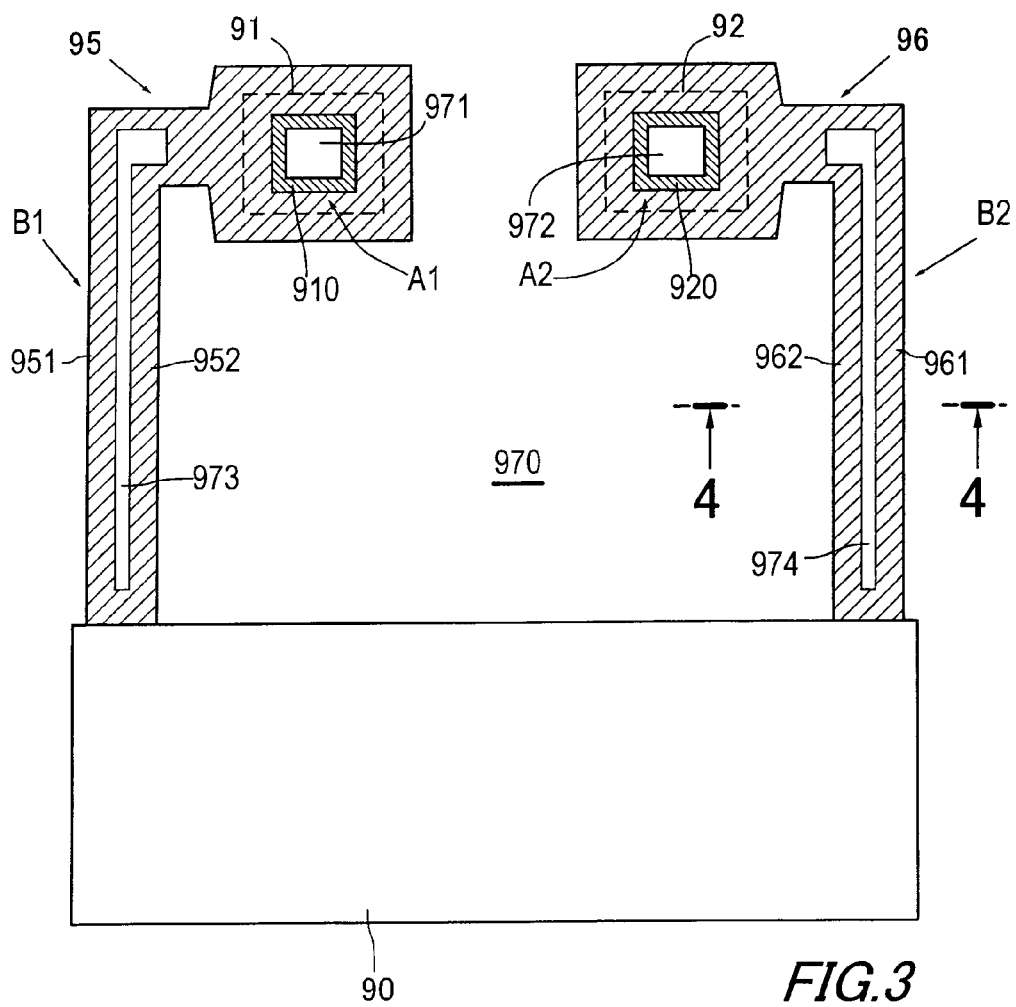
FIG. 3 is a plan view showing another embodiment of a thin-film device according to the present invention.
Figure 4:
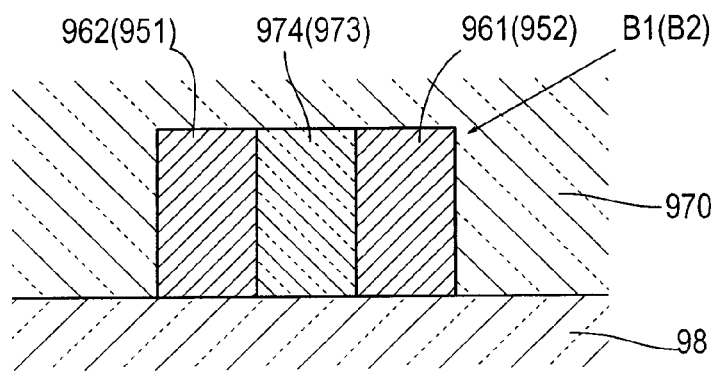
FIG. 4 is a sectional view taken along line 4-4 in FIG. 3.

Another embodiment which enables the increase in surface area corresponds to a case where the electric current direction is parallel to the film surface and the lead conductor film is shunted. FIGS. 3 and 4 illustrate its specific example. In the lead conductor film structure composed of the planar conductor portions 95, 96 and the projecting conductor portions 910, 920, referring to these figures, increased surface area portions B1, B2 are formed such that the planar conductor portions 95, 96 are partially occupied by insulating materials 973, 974.

Since the planar conductor portions 95, 96 are partially occupied by the insulating materials 973, 974, as described above, there are formed parallel shunts (951, 952) and (961, 962), which constitute the increased surface area portions B1, B2. In the increased surface area portions B1, B2, the high frequency signal current flows in a direction parallel to the film surface through the surface of the respective parallel shunts (951, 952) and (961, 962), thereby reducing the current density. This reduces the loss and heat generation due to the skin effect.

Also in the embodiment illustrated in FIGS. 3 and 4, the increase in surface area of the lead conductor film forming the planar conductor portions 95, 96 is achieved such that the insulating materials 973, 974 occupy a part of the volume, which should have been occupied by the lead conductor film forming the planar conductor portions 95, 96. That is, the volume to be occupied by the lead conductor film is partially replaced with the insulating materials 973, 974, unlike the technique of increasing the sectional area of the lead conductor film for increasing the surface area thereof. This sufficiently contributes to reduction of the loss and heat generation due to the skin effect even in a thin-film device in which a considerably fine pattern is required for the planar conductor portions 95, 96.

The structure having the increased surface area portions A1, A2 in the projecting conductor portions 910, 920 and the structure having the increased surface area portions B1, B2 in the planar conductor portions 95, 96 may be employed alone or in combination with each other. FIGS. 3 and 4 illustrate a combination thereof.

Figure 5:
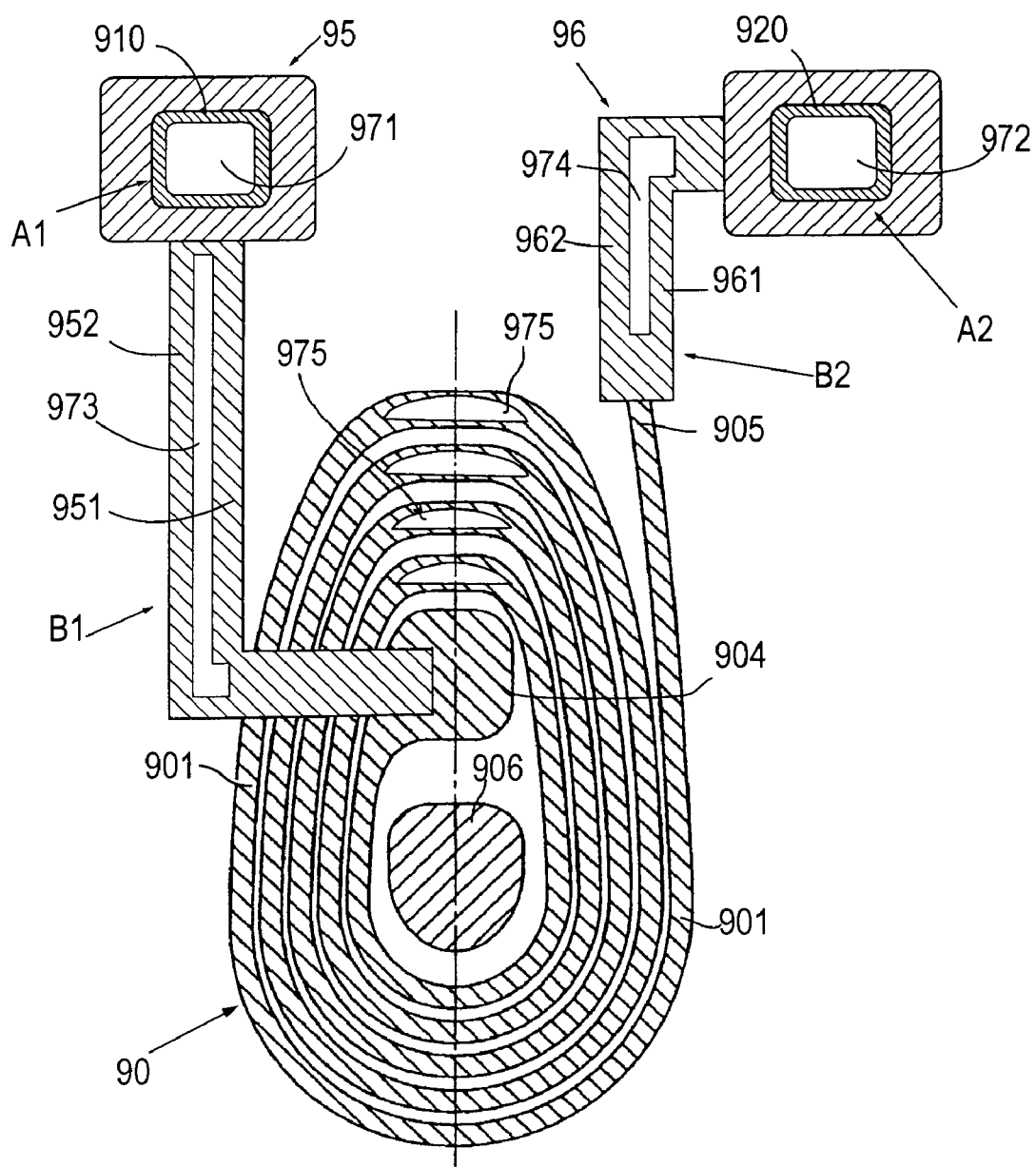
FIG. 5 is a plan view showing still another embodiment of a thin-film device according to the present invention.

Thin-film device according to the present invention includes a MR element, a variety of semiconductor elements and a passive circuit element such as an inductor. Among them, for example, in the case of a write element of a thin-film magnetic head or an independent inductor, as shown in FIG. 5, both ends 904, 905 of a coil film 901 are connected to the lead conductor film (95, 910) and the lead conductor film (96, 920) according to the present invention. In FIG. 5, the reference number 906 indicates a core.

This realizes an inductor which can reduce the loss and heat generation due to the skin effect at the lead conductor films (95, 910) and (96, 920).

In addition, the present invention is applicable to the coil film 901 itself. This enables reduction of the loss and heat generation due to the skin effect not only for the lead conductor film but also for the coil film 901.

When used for a thin-film magnetic head, for example, the coil film usually has an increased width portion rather than having a constant width over the entire length. Accordingly, the increased surface area portion may be formed such that the increased width portion is partially occupied by an insulating film 975, as shown in FIG. 5.

Figure 6:
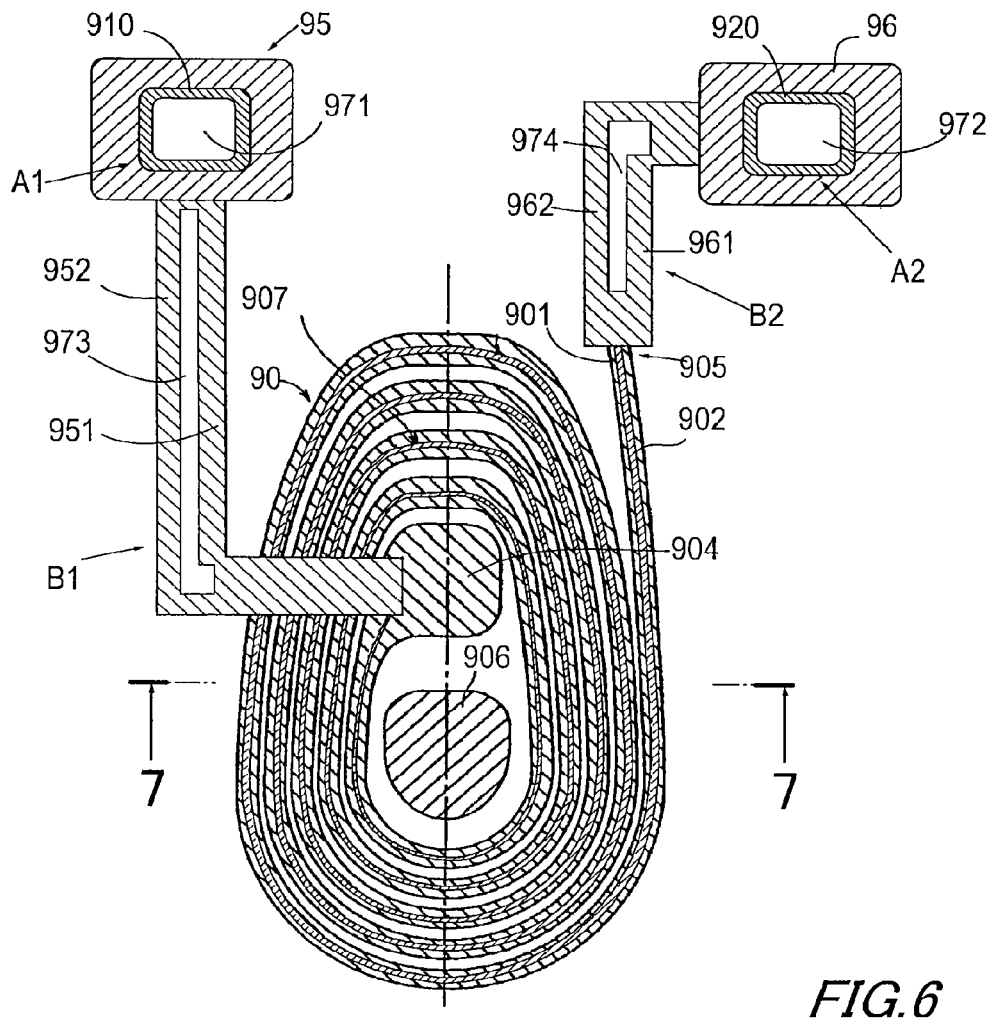
FIG. 6 is a plan view showing yet another embodiment of a thin-film device according to the present invention.
Figure 7:
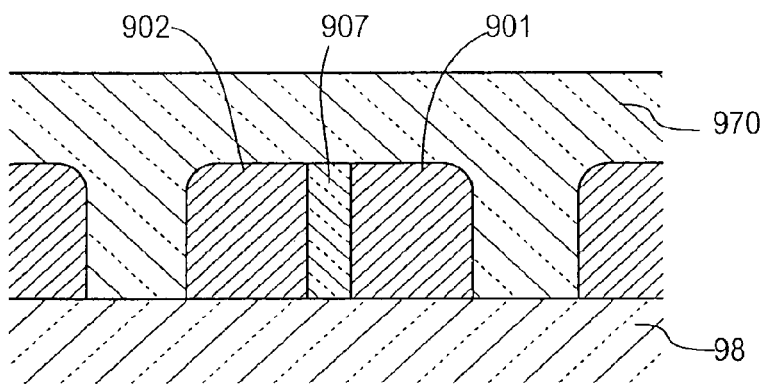
FIG. 7 is a sectional view taken along line 7-7 in FIG. 6.

Alternatively, the coil film may be composed of a plurality of (e.g., two) coil films 901, 902 separated from each other by an insulating film 907, as shown in FIGS. 6 and 7. The coil films 901, 902 and the insulating film 907 are disposed on a common plane and the coil films 901, 902 are separated from each other by the insulating film 907 on the common plane.

With this coil film structure, the contact area between the insulating film 907 and the coil films 901, 902 provides a surface area increasing effect on the surface area of the coil films 901, 902, as compared with a conventional case where the coil films 901, 902 are integrated together without the insulating film 907.

Also in this case, a part of the volume, which has been occupied by the integrated coil films 901, 902, is occupied by the insulating film 907, unlike the technique of increasing the sectional area of the integrated coil films for increasing the surface area thereof. This sufficiently contributes to reduction of the loss and heat generation due to the skin effect of the coil films 901, 902 even in a case in which a considerably fine pattern is required for the coil films 901, 902.

As means for preventing thermal deformation occurring at such a reduced level due to the increase in surface area of the coil films 901, 902, the insulating material 907 is preferably made of a high-modulus material such as $SiO_2$, specifically, $SiO_2$ with rutile structure. For the purpose of efficiently radiating the generated heat, it is also effective that the insulating material 907 is made of an insulating material having good thermal conductivity such as SiC, $Si_3N_4$ and MgO. This is the same as described above.

Although not illustrated in the drawings, it is also possible to provide a plurality of the coils of FIG. 6 in an overlapping or side-by-side relationship with each other.

Figure 8:
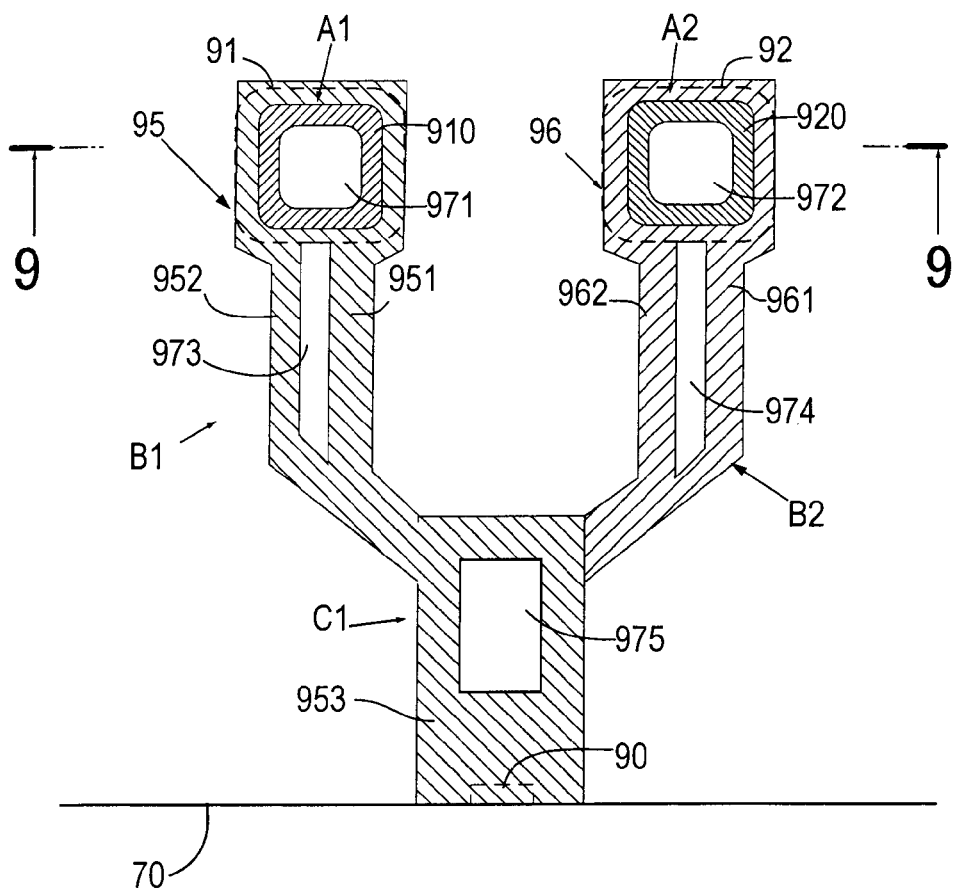
FIG. 8 is a plan view showing yet another embodiment of a thin-film device according to the present invention.
Figure 9:
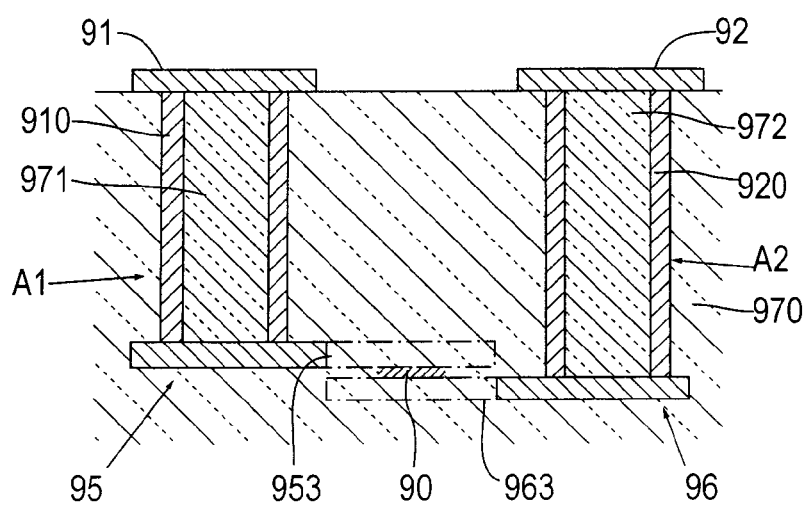
FIG. 9 is a sectional view taken along line 9-9 in FIG. 8.

Referring further to FIGS. 8 and 9, there is disclosed an embodiment in which the present invention is applied to a case where a MR element is employed as the thin-film element 90. The MR element 90 being a thin-film element is held between magnetic shield films 953, 963. The magnetic shield films 953, 963 are connected to the planar conductor portions 95, 96 of the lead conductor films, respectively, thereby forming a part of a feed line. The increased surface area portions A1, A2, B1, B2 and C1 are adopted for the projecting conductor portions 910, 920, the planar conductor portions 95, 96, and optionally the magnetic shield films 953, 963.

2. Thin-Film Magnetic Head

A thin-film magnetic head according to the present invention is a typical example of the above thin-film device. Next will be described a thin-film magnetic head according to the present invention. FIGS. 10 to 14 show a thin-film magnetic head to be used in combination with a rapidly spinning magnetic recording medium such as a hard disk. Thin-film magnetic heads of this type are generally called "floating-type". However, the thin-film magnetic head according to the present invention is not necessarily required to be of the floating-type. For example, it may be a thin-film magnetic head which comes into contact with a magnetic recording medium.

Figure 10:
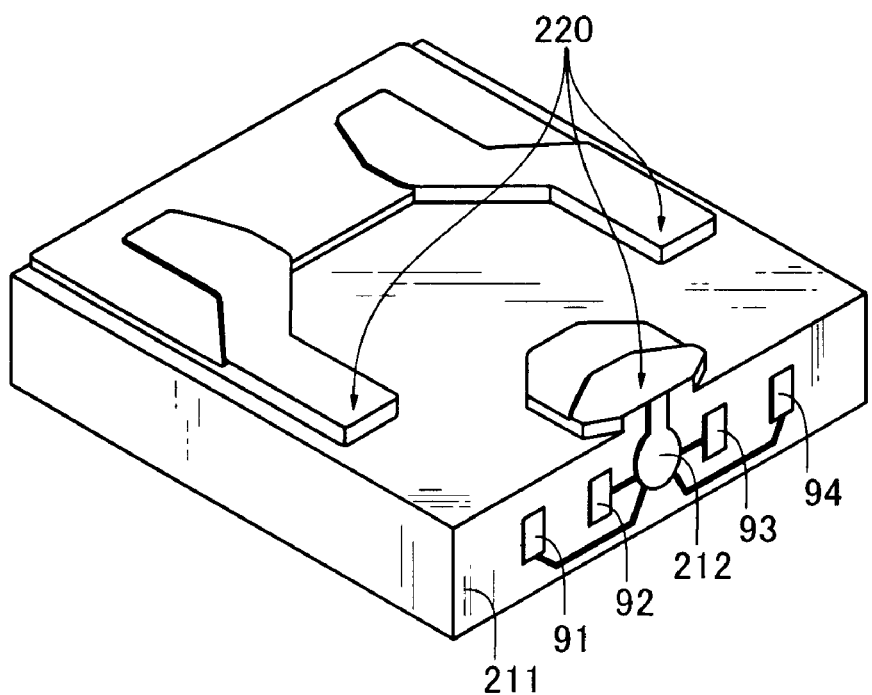
FIG. 10 is a perspective view of a thin-film magnetic head.

In the thin-film magnetic head, referring first to FIG. 10, a thin-film element 212 for performing both recording and reproducing processes is attached to one face of a substrate 211 made of, for example, a non-magnetic insulating material such as AlTiC to have a generally rectangular prism structure. The substrate 211 has an air bearing surface 220 directly related to the floating characteristics, and the thin-film element 212 is attached to a trailing-side end face perpendicular to the air bearing surface 220.

The trailing-side end face is provided with bumps 91 to 94 for the thin-film element 212. In thin-film magnetic heads of this type, a recording element and a reproducing element are provided as the thin-film element 212, and generally, four bumps 91 to 94 are provided in accordance with these elements. That is, the two bumps 91, 92 are provided for the recording element, while the other two bumps 93, 94 are provided for the reproducing element.

Details of the thin-film element 212 are shown in FIGS. 11 to 14. In FIGS. 11 to 14, dimensions along X, Y and Z axes are called "width", "length" and "thickness/height", respectively. Along the Y axis, moreover, one side close to an air bearing surface 70 and the other side remote therefrom are designated by "front" and "rear", respectively, and being positioned forward and being positioned rearward may be expressed by "project" and "recede", respectively.

The thin-film magnetic head shown in FIGS. 11 to 14 is a complex-type head which can perform both recording and reproducing. In the thin-film magnetic head, an insulating film 2, a reproducing head portion 100A using magneto-resistive effect (MR effect), a separating film 9, a recording head portion 100B for performing a recording process in a perpendicular recording method, and an overcoat film 21 are layered on a substrate 1 in the mentioned order.

The substrate 1 is made of, for example, a ceramic material such as AlTiC($Al_2O_3$·TiC), while the insulating film 2, the separating film 9 and the overcoat film 21 are made of, for example, a non-magnetic insulating material such as aluminum oxide ($Al_2O_3$: hereinafter merely referred to as "alumina").

The reproducing head portion 100A is formed, for example, by layering a lower read shield film 3, a shield gap film 4, and an upper read shield film 30 in the mentioned order. In the shield gap film 4, a reproducing element (or MR element 8) is embedded in such a manner as to be exposed on the air bearing surface 70. The air bearing surface 70 is uniquely defined with reference to one end face of the substrate 1 supporting a series of components from the insulating film 2 to the overcoat film 21, more specifically, refers to a surface containing one end face of the substrate 1.

Both the lower read shield film 3 and the upper read shield film 30 function to magnetically separate the MR element 8 from the surroundings and extend rearward from the air bearing surface 70. The lower read shield film 3 is made of, for example, a magnetic material such as a nickel (Ni)-iron alloy (NiFe). In this case, the nickel (Ni)-iron alloy (NiFe) may have a composition ratio of 80 wt. % of Ni and 20 wt. % of Fe. The upper read shield film 30 is formed, for example, by layering two upper read shield film portions 5, 7 with a non-magnetic film 6 interposed therebetween. Both the upper read shield film portions 5, 7 are made of, for example, a magnetic material such as a nickel (Ni)-iron alloy. The non-magnetic film 6 is made of, for example, a non-magnetic material such as ruthenium (Ru) or alumina. The upper read shield film 30 is not necessarily required to have a layered structure but may have a single film structure of a magnetic material.

The shield gap film 4 functions to electrically separate the MR element 8 from the surroundings and is made of, for example, a non-magnetic insulating material such as alumina. The MR element 8 uses giant magneto-resistive effect (GMR) or tunneling magneto-resistive effect (TMR), for example.

The recording head portion 100B is a so-called shield-type perpendicular recording element including a non-magnetic film 11, a first non-magnetic film 15, a magnetic pole film 50, a gap film 16 with an opening (or back gap 16BG) for magnetic connection, a coil film 18 embedded in an insulating film 19, and a magnetic film 60.

The magnetic pole film 50 extends rearward from the air bearing surface 70. The magnetic pole film 50 includes an auxiliary magnetic pole film 10, a second non-magnetic film 12, and a main magnetic pole film 40.

Figure 11:
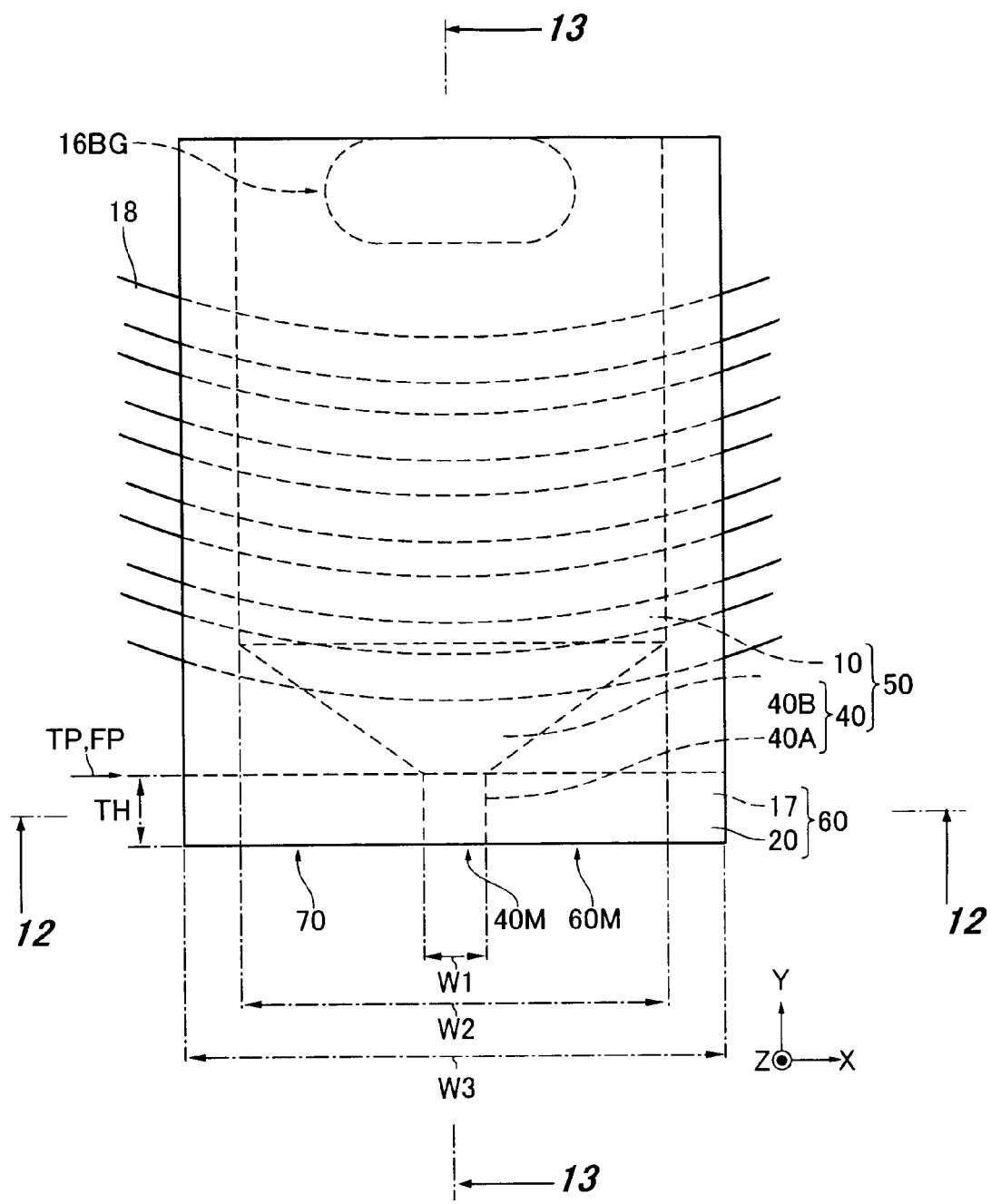
FIG. 11 is a plan view showing a magnetic pole structure in the thin-film magnetic head shown in FIG. 10.
Figure 12:
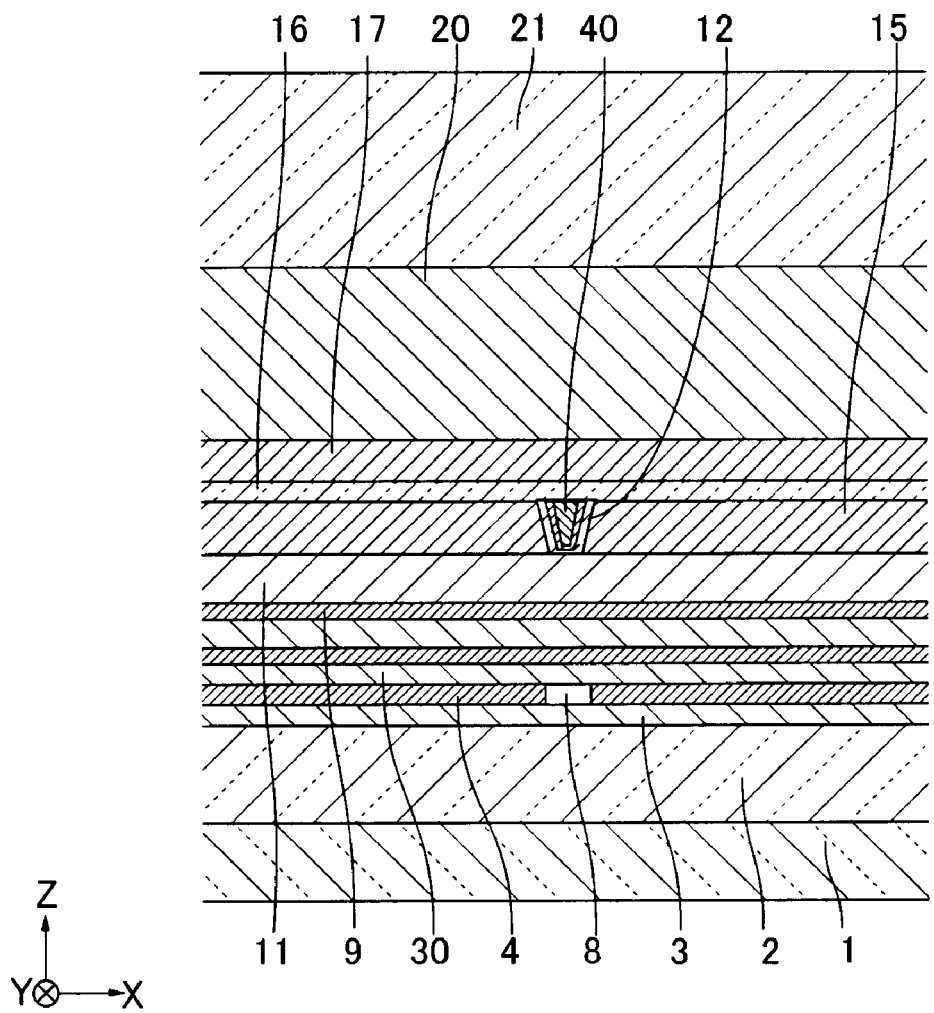
FIG. 12 is a sectional view taken along line 12-12 in FIG. 11.
Figure 13:
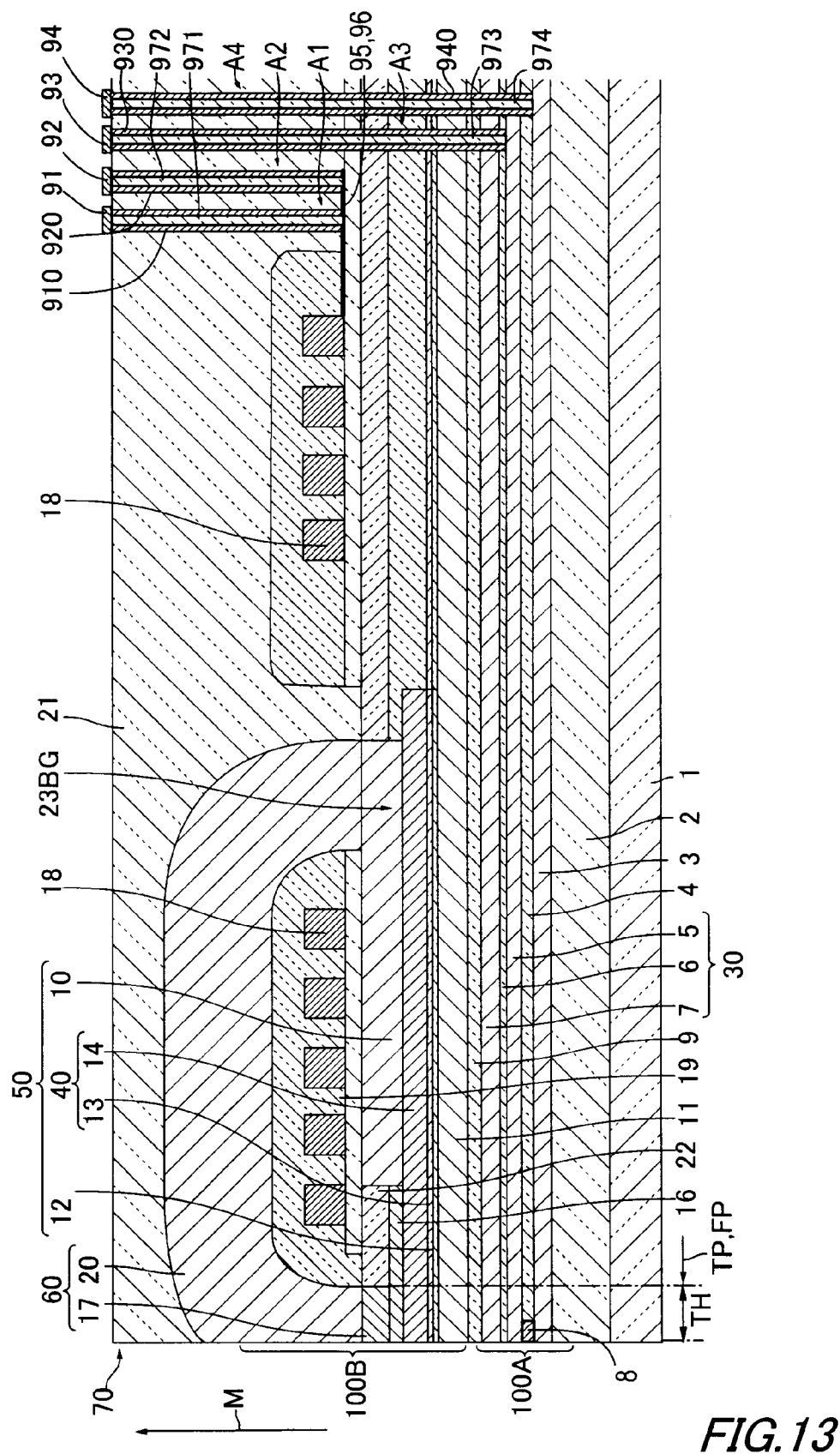
FIG. 13 is a sectional view taken along line 13-13 in FIG. 11.

The auxiliary magnetic pole film 10 extends from behind the air bearing surface 70 to the back gap 16BG. For example, the auxiliary magnetic pole film 10 is disposed on the leading side with respect to the main magnetic pole film 40 and has a rectangular plan shape (width W2), as shown in FIG. 11. The non-magnetic film 11 functions to electrically and magnetically separate the auxiliary magnetic pole film 10 from the surroundings and is made of, for example, a non-magnetic insulating material such as alumina.

Figure 14:
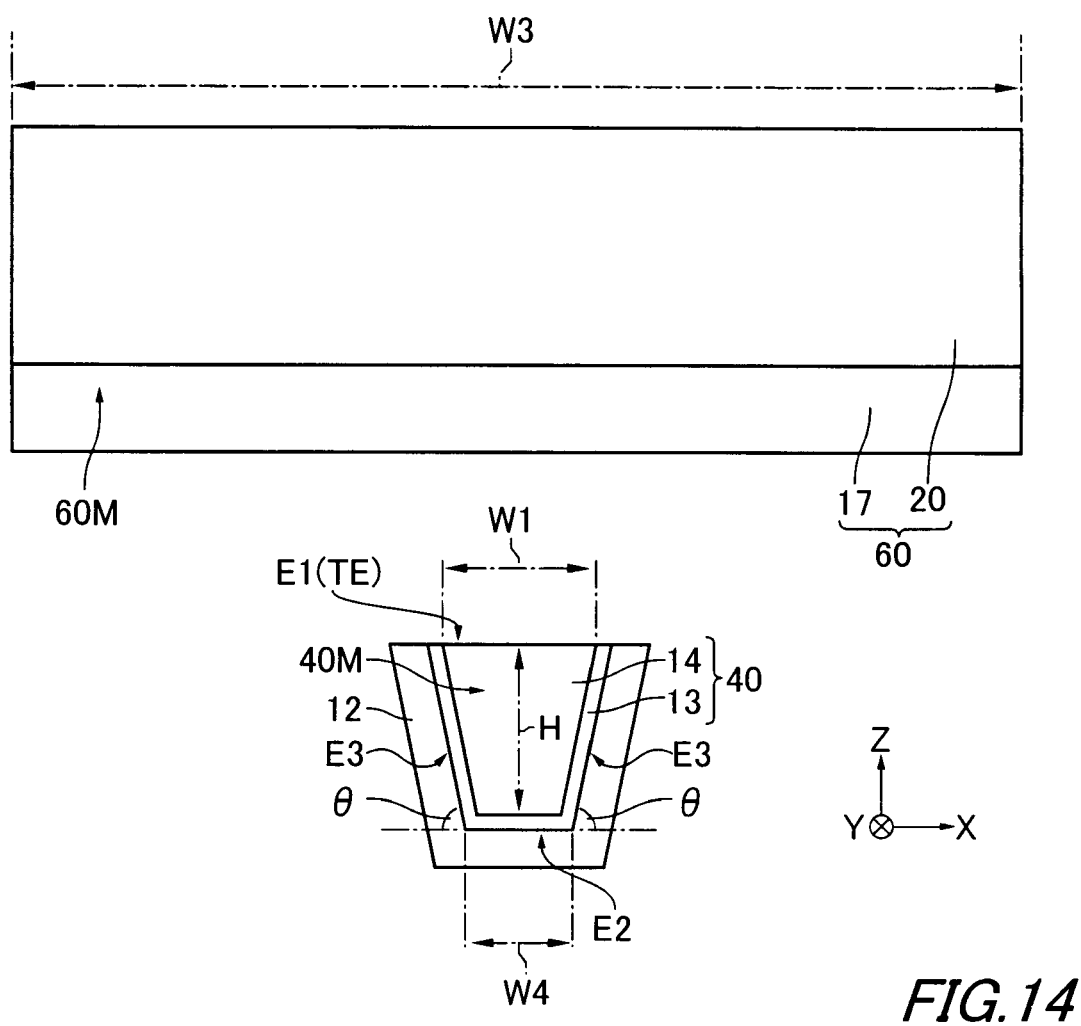
FIG. 14 is a plan view of a main magnetic pole film in the thin-film magnetic head shown in FIGS. 10 to 14.

The second non-magnetic film 12 is made of a non-magnetic insulating material such as alumina or aluminum nitride. The sectional shape of the second non-magnetic film 12 parallel to the air bearing surface 70 is U-shaped, as shown in FIG. 14, and the main magnetic pole film 40 is embedded inside the second non-magnetic film 12. The second non-magnetic film 12 is formed, for example, by ALD to have a uniform thickness around the main magnetic pole film 40 (along its bottom face and both side faces).

The first non-magnetic film 15 functions to electrically and magnetically separate the main magnetic pole film 40 from the surroundings. The first non-magnetic film 15 is embedded outside the second non-magnetic film 12 and is made of, for example, a non-magnetic insulating material such as alumina.

The first and second non-magnetic films 15, 12 are each made of a non-magnetic insulating material but have different compositions because of their different formation methods. More specifically, the first non-magnetic film 15 is formed such as by sputtering using an inert gas and contains the inert gas because of its formation method. It should be noted that examples of the inert gas include argon (Ar), krypton (Kr) and xenon (Xe). On the other hand, the second non-magnetic film 12 is formed such as by ALD not using any inert gas and contains no inert gas because of its formation method. Whether the first and second non-magnetic films 15, 12 contain any inert gas or not can be determined by using a composition analysis method such as scanning transmission electron microscopy (STEM)—energy-dispersive X-ray spectroscopy (EDS).

The first and second non-magnetic films 15, 12 are also different in the content of specific components because of their different formation methods. More specifically, since water and trimethyl aluminum (TMA) are used in ALD but not used in sputtering, the content of hydrogen (H) is larger in the second non-magnetic film 12 than in the first non-magnetic film 15.

The main magnetic pole film 40 extends from the air bearing surface 70 to the back gap 16BG. The main magnetic pole film 40 includes, for example, a small width portion 40A extending rearward from the air bearing surface 70 and a large width portion 40B connected to the rear end of the small width portion 40A, as shown in FIGS. 11 to 14. The small width portion 40A is a substantial magnetic flux emitting portion (so-called magnetic pole film) and has a constant width W1 which defines the recording track width. The large width portion 40B is a portion intended to supply a magnetic flux to the small width portion 40A and has a width W2 larger than the width W1. The width W2 of the large width portion 40B is almost constant. The large width portion 40B is gradually narrowed in its front portion toward the front end portion 40A. The position where the width of the main magnetic pole film 40 starts to increase from W1 to W2 is a so-called flare point FR.

An end face 40M of the main magnetic pole film 40 on the side close to the air bearing surface 70 is of, for example, an inverted trapezoid shape (height H), whose upper bottom and lower bottom are the longer side on the trailing side and the shorter side on the leading side, respectively, as shown in FIG. 14. Concretely, the end face 40M has a shape defined by an upper end edge E1 (width W1) on the trailing side, a lower end edge E2 (width W4) on the leading side, and two side edges E3, wherein the width W4 is smaller than the width W1. The upper end edge E1 is a substantial recording portion of the magnetic pole film 50, and its width W1 is approximately 0.2 µm or less. The bevel angle θ of the end face 40M (or angle between a direction along which the lower end edge E2 extends and the side edge E3) may be set arbitrarily, for example, within the range of less than 90 degrees.

The gap film 16 is a gap for magnetically separating the magnetic pole film 50 and the magnetic film 60 and is made of, for example, a non-magnetic insulating material such as alumina or a non-magnetic conductive material such as ruthenium. The thickness of the gap film 16 is approximately 0.03 to 0.1 µm.

The coil film 18 functions to generate a magnetic flux and is made of, for example, a highly conductive material such as copper (Cu). The coil film 18 is wound around the back gap 16BG to have a winding structure (or spiral structure), as shown in FIG. 11.

The insulating film 19 functions to electrically separate the coil film 18 from the surroundings and is made of, for example, a non-magnetic insulating material such as a photoresist or a spin on glass (SOG) which becomes liquid when heated. The forefront position of the insulating film 19 is a throat height zero position TP, and the distance between the throat height zero position TP and the air bearing surface 70 is a so-called "throat height TH". For example, FIG. 11 shows a state where the throat height zero position TP matches the flare point FP.

The magnetic film 60 functions to absorb a spreading component of a magnetic flux emitted from the magnetic pole film 50 so as to increase the gradient of the perpendicular magnetic field and also absorb a magnetic flux returning from the recording medium so as to circulate the magnetic flux between the recording head portion 100B and a magnetic recording medium 80. The magnetic film 60, which extends rearward from the air bearing surface 70 on the trailing side of the magnetic pole film 50, is separated from the magnetic pole film 50 by the gap film 16 at its front but connected to the magnetic pole film 50 through the back gap 16BG at its rear. On the side close to the air bearing surface 70, the magnetic film 60 has an end face 60M which is, for example, of a rectangular shape having a width W3 larger than the width W1, as shown in FIG. 11. The magnetic film 60 includes, for example, a write shield film 17 and a return yoke film 20 which are distinct from each other.

The write shield film 17 functions to mainly increase the gradient of the perpendicular magnetic field and is made of, for example, a high saturation magnetic flux density material such as an cobalt-nickel-iron alloy (CoNiFe) or an iron-based alloy. Particularly by absorbing a spreading component of a magnetic flux emitted from the magnetic pole film 50, the write shield film 17 functions to: (1) increase the magnetic field gradient of the perpendicular magnetic field; (2) decrease the recording width; and (3) incorporate an oblique magnetic field component into the perpendicular magnetic field. However, the write shield film 17 may additionally function to circulate the magnetic flux like the return yoke film 20. The write shield film 17 is adjacent to the gap film 16 and extends rearward from the air bearing surface 70 to have its rear end adjacent to the insulating film 19. Thus, the write shield film 17 serves to define the forefront position (throat height zero position TP) of the insulating film 19.

The return yoke film 20 functions to circulate the magnetic flux and is made of, for example, a magnetic material similar to that of the write shield film 17. The return yoke film 20 extends from the air bearing surface 70, through above the insulating film 19, to the back gap 16BG on the trailing side of the write shield film 17 and is connected to the write shield film 17 at its front but to the magnetic pole film 50 at its rear through the back gap 16BG, as shown in FIG. 14.

The overcoat film 21 functions to protect the thin-film magnetic head and is made of, for example, a non-magnetic insulating material such as alumina.

In the above thin-film magnetic head, the coil film 18 may adopt the lead conductor film structure shown in FIGS. 1 to 9, while the MR element 8 may adopt the lead conductor film structure shown in FIGS. 1 to 4, 8 and 9.

Describing with appropriate reference to FIGS. 1 to 9, the planar conductor portion 95 is connected to one end of the coil film 18, and the projecting conductor portion 910 is disposed on one surface of the planar conductor portion 95. The projecting conductor portion 910 is a Cu plated film with one end face substantially flush with the surface of the overcoat film 21.

The planar conductor portion 96 is connected to the other end of the coil film 18, and the projecting conductor portion 920 is disposed on one surface of the planar conductor portion 96. The projecting conductor portion 920 is a Cu plated film projecting from the planar conductor portion 96 with one end face substantially flush with the surface of the overcoat film 21.

The bumps 91, 92 are portions to which an outer conductor is to be connected and their surface is formed by an Au plated film or the like.

In the above structure, the lead conductor film (95, 910) and the lead conductor film (96, 920) have the increased surface area portions A1, A2 between one end connected to the coil film 18 and the other end disposed with the bumps 91, 92. As shown in FIGS. 1 and 2, the increased surface area portions A1, A2 are formed with the insulating materials 971, 972 embedded in the projecting conductor portions 910, 920 such that the projecting conductor portions 910, 920 surround the insulating materials 971, 972. Accordingly, the surface area of the conductor film increases at the projecting conductor portions 910, 920 by an amount corresponding to the contact area between the insulating materials 971, 972 and the conductor film forming the projecting conductor portions 910, 920.

In the increased surface area portions A1, A2, accordingly, the high frequency signal current due to the skin effect flows in a widely distributed manner over the enlarged surface, thereby reducing the current density. This reduces the loss and heat generation due to the skin effect.

The increase in surface area of the projecting conductor portions 910, 920 is achieved such that the insulating materials 971, 972 occupy a part of the volume, which should have been occupied by the lead conductor film forming the projecting conductor portions 910, 920. Thus, the present invention sufficiently contributes to reduction of the loss and heat generation due to the skin effect even in a thin-film device that requires a considerably fine pattern.

As described above, as means for preventing thermal deformation due to heat generated at such a reduced level, the insulating materials 971, 972 are preferably made of a high-modulus material such as $SiO_2$, specifically, $SiO_2$ with rutile structure, and for the purpose of efficiently radiating the heat, it is effective that the insulating materials 971, 972 are made of an insulating material having good thermal conductivity such as SiC, $Si_3N_4$ and MgO.

Although not illustrated in the drawings, the planar conductor portions 95, 96 may be partially occupied by an insulating material to provide increased surface area portions, as illustrated in and described with reference to FIGS. 3 and 4.

In the thin-film magnetic head, since the coil film 18 has an increased coil width at its rear portion, increased surface area portions may be provided by partially occupying it by an insulating material at its rear increased width portion, as shown in FIG. 5. Here, the structure shown in FIGS. 6 to 9 may be adopted as the structure of the coil film 18.

When the lead conductor film structure shown in FIGS. 1 to 4, 8 and 9 is adopted for the MR element 8, the lower read shield film 3 and the upper read shield film 30 are used as planar conductor portions, and projecting conductor portions 930, 940 are formed thereon and provided with increased surface area portions A3, A4. As shown in FIGS. 1 and 2, the increased surface area portions A3, A4 are formed with insulating materials 973, 974 embedded in the projecting conductor portions 930, 940 such that the projecting conductor portions 930, 940 surround the insulating materials 973, 974. Accordingly, the surface area of the conductor film increases at the projecting conductor portions 930, 940 by an amount corresponding to the contact area between the insulating materials 973, 974 and the conductor film forming the projecting conductor portions 930, 940.

In the increased surface area portions A3, A4, accordingly, the high frequency signal current due to the skin effect flows in a widely distributed manner over the enlarged surface, thereby reducing the current density. This reduces the loss and heat generation due to the skin effect.

3. Head Assembly

The present invention further discloses a head assembly. The head assembly includes the foregoing thin-film magnetic head and a head support device. The head support device supports the thin-film magnetic head in such a manner as to permit rolling and pitching of the thin-film magnetic head. In the present invention, examples of the head assembly include an HGA (head gimbal assembly) in which the thin-film magnetic head is mounted on a head support device (or gimbal) and an HAA (head arm assembly) in which the HGA is mounted on an arm.

Figure 15:
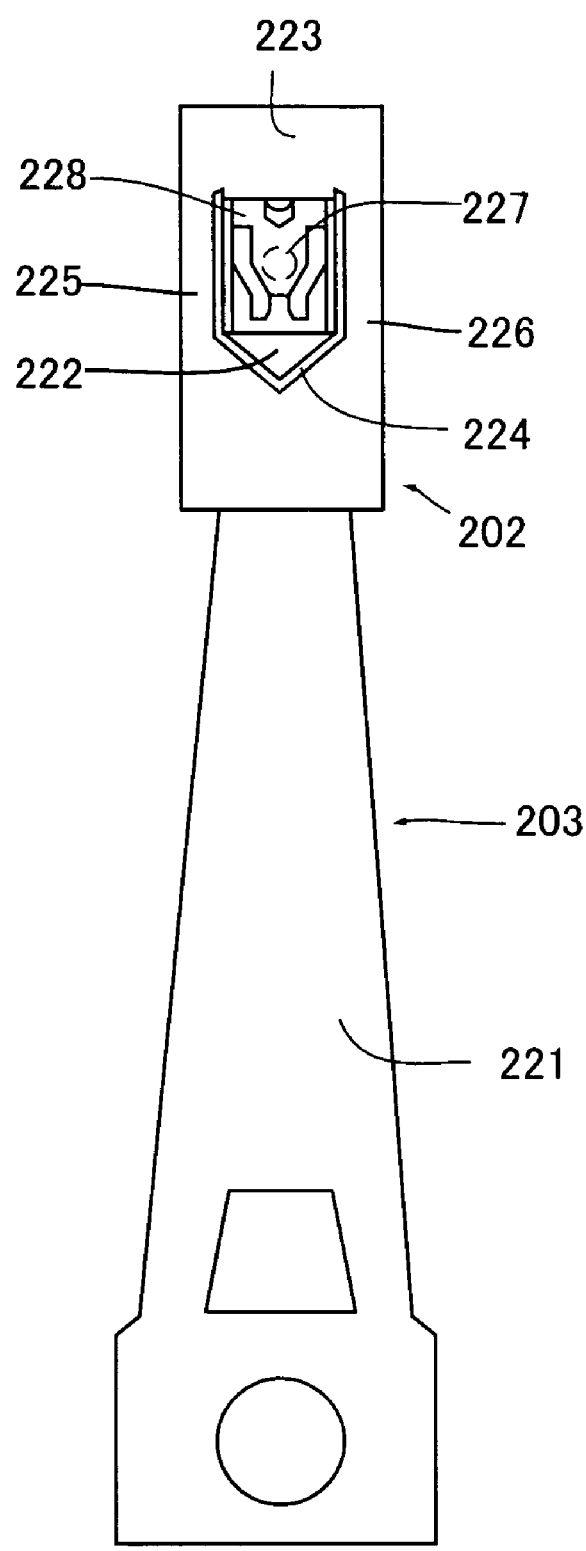
FIG. 15 is a plan view of an HGA according to the present invention.
Figure 16:
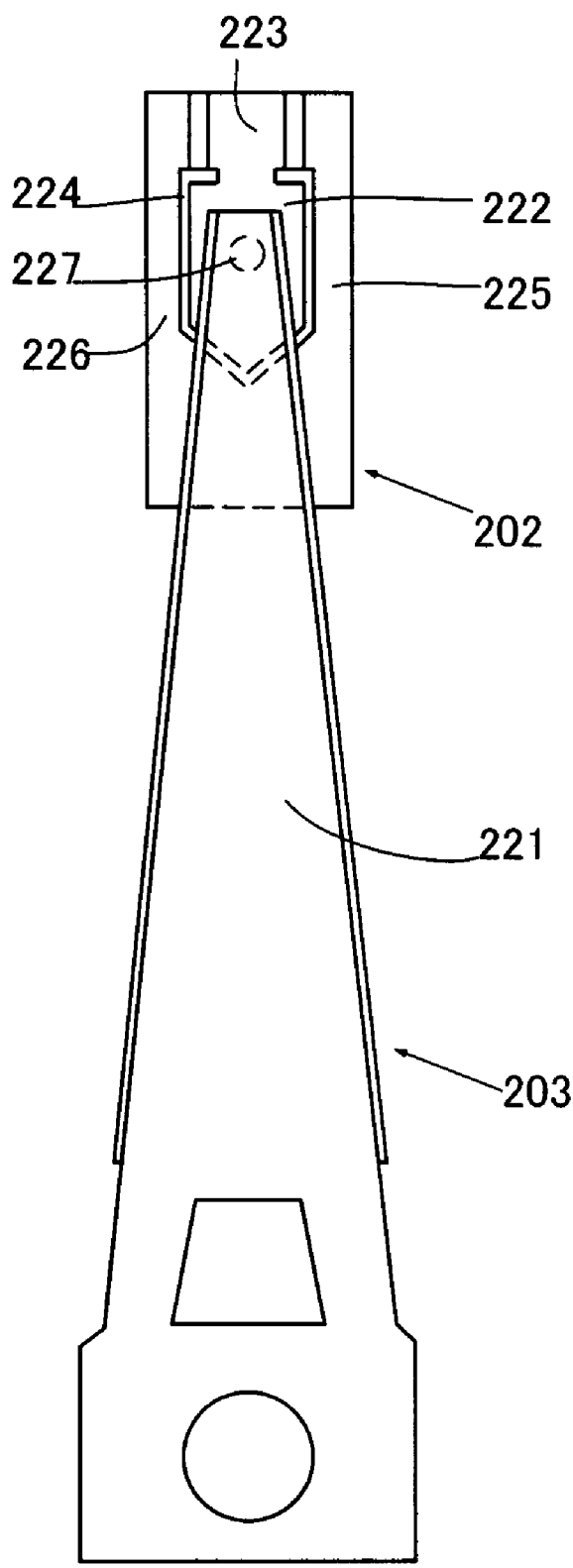
FIG. 16 is a bottom view of the HGA shown in FIG. 15.

FIG. 15 is a front view of a head assembly according to the present invention, and FIG. 16 is a bottom view of the head assembly shown in FIG. 15. The illustrated head assembly is an HGA including a suspension 203 and a thin-film magnetic head 228. The suspension 203 includes a load beam 221 and a flexure 202. The load beam 221 has a load dimple 227 in proximity to a free end on a centrally-extending longitudinal axis.

The flexure 202 is formed from a thin leaf spring and subjected to a pressing load from the load dimple 227 with one side thereof attached to one side of the load beam 221 where the load dimple 227 is located. The thin-film magnetic head 228 is attached to the other side of the flexure 202. The flexure 202 is bonded to the load beam 221 at the side where the load dimple 227 is located.

The flexure 202 has a tongue portion 222 in the center thereof. At one end, the tongue portion 222 is bonded to a lateral frame portion 223 of the flexure 202. Both ends of the lateral frame portion 223 of the flexure 202 are connected to outer frame portions 225, 226. A groove 224 is formed between the tongue portion 222 and the outer frame portions 225, 226, extending around the tongue portion 222. The thin-film magnetic head 228 is attached to one side of the tongue portion 222 through an adhesive or the like to be in spring contact with the tip of the load dimple 227.

One face of the thin-film magnetic head 228 opposite to the air bearing surface of the slider is attached to the tongue portion 222 of the suspension 203. Flexible leads and the like not shown in the drawings are connected to the thin-film magnetic head 228.

Figure 17:
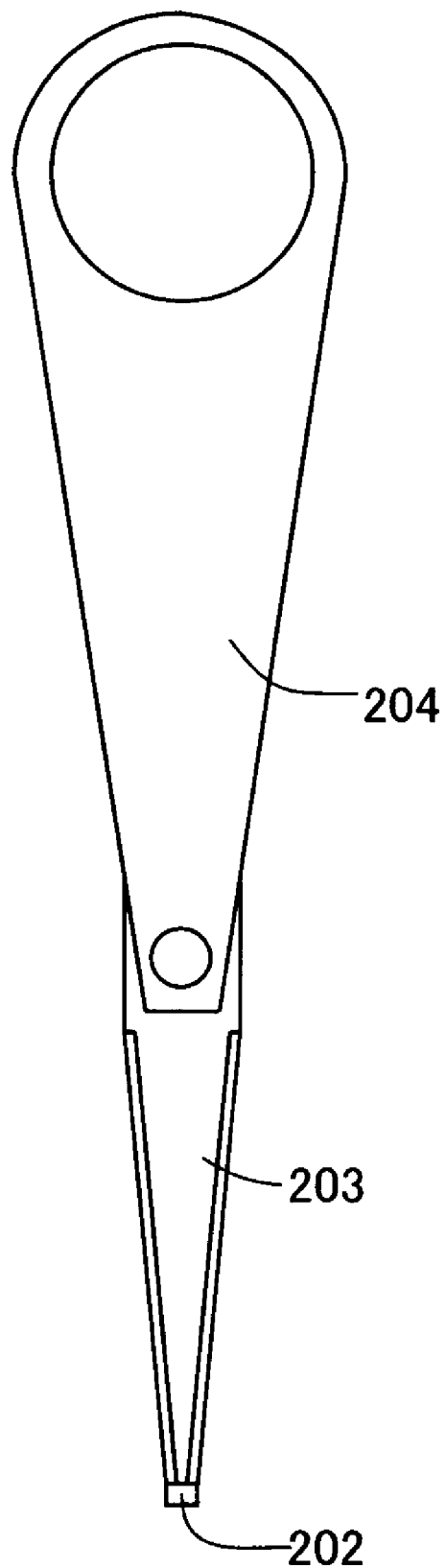
FIG. 17 is a plan view of an HAA according to the present invention.

FIG. 17 is a front view of an HAA. The illustrated HAA includes the suspension 203, the thin-film magnetic head 228 and an arm 204. The arm 204 is integrally formed of a suitable non-magnetic metallic material such as an aluminum alloy. The arm 204 is provided with a mounting hole. The mounting hole is used for mounting on a positioning device provided in a magnetic disk apparatus. One end of the suspension 203 is secured to the arm 204, for example, with a ball connecting structure.

4. Magnetic Recording/Reproducing Apparatus

Figure 18:
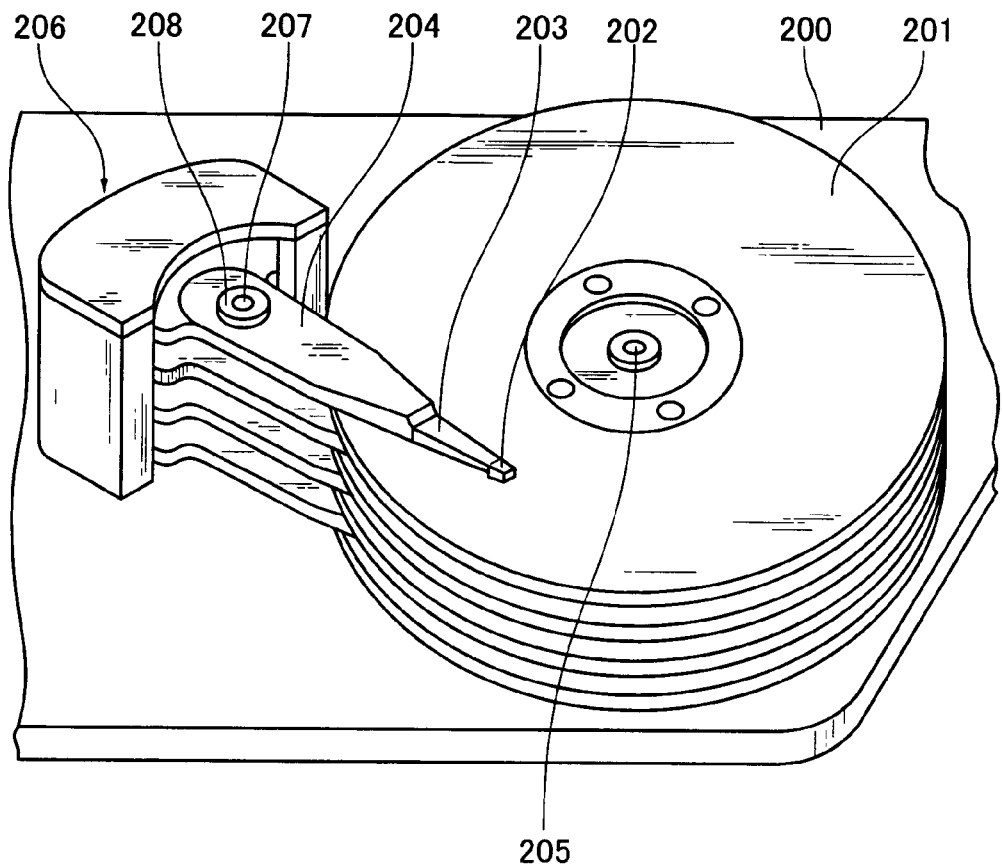
FIG. 18 is a perspective view of a magnetic recording apparatus according to the present invention.

Next will be described a structure of a magnetic recording apparatus mounted with the thin-film magnetic head according to the present invention. FIG. 18 shows the structure of the magnetic recording apparatus. The magnetic recording apparatus, which is mounted with the foregoing thin-film magnetic head, is, for example, a hard disk drive.

As shown in FIG. 18, for example, the magnetic recording apparatus includes, within a case 200, a plurality of magnetic disks (e.g., hard disks) 201 corresponding to the magnetic recording medium 80 for magnetically recording information, a plurality of suspensions 203 disposed corresponding to the respective magnetic disks 201 and supporting the thin-film magnetic heads at their one ends, and a plurality of arms 204 supporting the other ends of the suspensions 203. The magnetic disks 201 are rotatable about a spindle motor 205 which is fixed to the case 200. The arms 204 are connected to an actuator 206 which functions as a power source and are pivotable through a bearing 208 about a fixed shaft 207 which is fixed to the case 200.

The actuator 206 is constructed to include, for example, a driving source such as a voice coil motor. For example, the magnetic recording apparatus is a model where the plurality of arms 204 are pivotable about the fixed shaft 207 in an integrated manner. In FIG. 18, the case 200 is shown partially cut-out to make it easy to see the internal structure of the magnetic recording apparatus.

The thin-film magnetic head 228 is a thin-film magnetic head according to the present invention. When the magnetic disk 201 rotates for recording or reproducing information, an air flow generated between the recording surface (or thin-film magnetic head-facing surface) of the magnetic disk 201 and the air bearing surface 220 is utilized to let the thin-film magnetic head take off from the recording surface of the magnetic disk 201.

Figure 19:
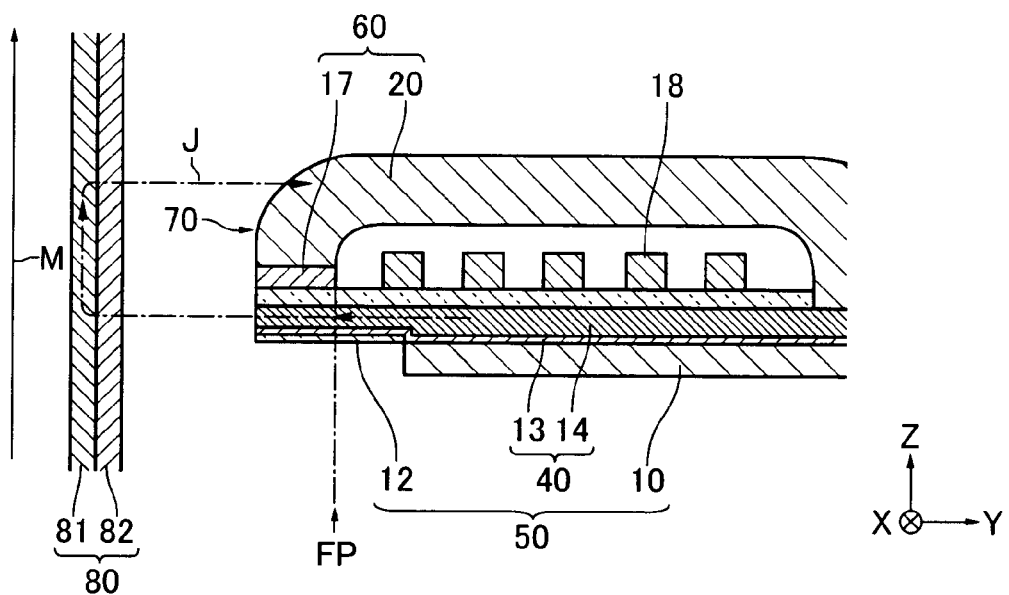
FIG. 19 is a view illustrating recording operation of the magnetic recording/reproducing apparatus shown in FIG. 18.

As shown in FIG. 19, the magnetic recording medium 80 includes, for example, a magnetization film 81 and a soft magnetic film 82 disposed close to and remote from the thin-film magnetic head, respectively. The magnetization film 81 functions to magnetically record information, while the soft magnetic film 82 functions as a path of a magnetic flux (so-called flux path) in the magnetic recording medium 80. The magnetic recording medium 80 of this type is generally called "double layer recording medium" for perpendicular recording. Needless-to-say, the magnetic recording medium 80 may include another layer, for example, in addition to the above magnetization film 81 and soft magnetic film 82.

The upwardly directed arrow shown in FIG. 18 indicates the moving direction M along which the magnetic recording medium 80 relatively moves with respect to the thin-film magnetic head. Assuming that the movement of the magnetic recording medium 80 moving in the moving direction M is a kind of flow, the foregoing "trailing side" refers to a flow-out side (or front side in the moving direction M), and particularly in this case, refers to an upper side in the thickness direction (Z-axis direction). On the other hand, a flow-in side (or rear side in the moving direction M) is referred to as "leading side", and particularly in this case, corresponds to a lower side in the thickness direction. The upper end edge E1, which is a recording portion of the main magnetic pole film 40, is called "trailing edge TE", and its width W1 is called "trailing edge width".

Recording and reproducing operations to be performed by the above magnetic recording/reproducing apparatus will be described with reference to FIG. 19. When recording information, specifically, a recording magnetic flux J is generated as a current flows from an external circuit not shown in the drawings to the coil film 18 of the recording head portion 100B. After absorbed in the auxiliary magnetic pole film 10 and the main magnetic pole film 40 of the magnetic pole film 50, the magnetic flux J flows toward the narrow width portion 40A. At this time, since the magnetic flux J is focused because of narrowing at the flare point FP, it is finally concentrated in the vicinity of the trailing edge TE. When the magnetic flux J concentrated in the vicinity of the trailing edge TE is emitted to generate a perpendicular magnetic field, the magnetization film 81 is magnetized by the perpendicular magnetic field, thereby magnetically recording information on the magnetic recording medium 80.

In this case, the gradient of the perpendicular magnetic field increases because the spreading component of the magnetic flux J is absorbed in the write shield film 17. The magnetic flux J absorbed in the write shield film 17 is resupplied to the magnetic pole film 50 through the return yoke film 20.

After magnetization of the magnetization film 81, the magnetic flux J emitted from the magnetic pole film 50 toward the magnetic recording medium 80 is absorbed in the return yoke film 20 through the soft magnetic film 82. At this time, a part of the magnetic flux J is also absorbed in the write shield film 17. The magnetic flux J absorbed in the write shield film 17 and the return yoke film 20 is also resupplied to the magnetic pole film 50. This enables circulation of the magnetic flux J between the recording head portion 100B and the magnetic recording medium 80.

Here, since the thin-film magnetic head according to the present invention can achieve both the improvement in overwrite characteristic by increasing the saturation magnetic flux density and the improvement in pole erase by decreasing the coercive force, there can be obtained a magnetic recording/reproducing apparatus in which the pole erase is improved and at the same time, sufficient overwrite characteristic (OW) can be assured with respect to the magnetic recording medium 80 that has a high coercive force for improvement in recording capacity.

The present invention has been described in detail above with reference to preferred embodiments. However, obviously those skilled in the art could easily devise various modifications of the invention based on the technical concepts underlying the invention and teachings disclosed herein.

What is claimed is:

1. A thin-film device comprising a thin-film element and a lead conductor film,
wherein said thin-film element and said lead conductor film are embedded in an insulating film, and
said lead conductor film has a terminal area at one end thereof, is connected to said thin-film element at the other end thereof, and between said one end and said the other end, has an increased surface area portion whose volume is partially occupied by an insulating material to increase surface area,
wherein said increased surface area portion is formed with said insulating material embedded in said lead conductor film.

2. The thin-film device of claim 1, wherein said lead conductor film has a planar conductor portion and a projecting conductor portion,
said projecting conductor portion projects from said planar conductor portion, and
said increased surface area portion is provided between one end face of projecting conductor portion and said planar conductor portion.

3. The thin-film device of claim 2, wherein said projecting conductor portion has a tubular conductor portion whose inside is occupied by said insulating material.

4. The thin-film device of claim 1, wherein said increased surface area portion is formed with said insulating material to shunt said lead conductor film.

5. The thin-film device of claim 4, wherein said lead conductor film has a planar conductor portion and a projecting conductor portion,
said projecting conductor portion projects from said planar conductor portion,
said increased surface area portion is provided between said one end face of said projecting conductor portion and said planar conductor portion, and
said planar conductor portion has parallel shunts, and said increased surface area portion is formed such that an area between said parallel shunts is occupied by said insulating material.

6. The thin-film device of claim 1, wherein said thin-film element includes a coil film whose ends are each connected to said lead conductor film.

7. The thin-film device of claim 6, wherein said coil film includes a plurality of coil films separated from each other by an insulating film.

8. The thin-film device of claim 7, wherein said plurality of coil films are coplanar with said insulating film and said plurality of coil films are separated from each other by said insulating film.

9. The thin-film device of claim 8, wherein said plurality of coil films are connected in parallel with each other.

10. The thin-film device of claim 6, wherein said coil film has an increased width portion, and said increased surface area portion is formed such that said increased width portion is partially occupied by said insulating film.

11. The thin-film device of claim 1, wherein said insulating film is made of $SiO_2$.

12. The thin-film device of claim 1, wherein said insulating film is made of at least a material selected from the group consisting of SiC, $Si_3N_4$ and MgO.

13. The thin-film device of claim 1, wherein said thin-film element is a magneto-resistive effect film.

14. A thin-film magnetic head comprising a slider, at least one thin-film element and a lead conductor film,
wherein said thin-film element is an electromagnetic conversion element and supported by said slider,
said thin-film element and said lead conductor film are embedded in an insulating film, and
said lead conductor film has a terminal area at one end thereof, is connected to said thin-film element at the other end thereof, and between said one end and said the other end, has an increased surface area portion whose volume is partially occupied by an insulating material to increase surface area,
wherein said increased surface area portion is formed with said insulating material embedded in said lead conductor film.

15. The thin-film magnetic head of claim 14, wherein said lead conductor film has a planar conductor portion and a projecting conductor portion,
said projecting conductor portion projects from said planar conductor portion, and
said increased surface area portion is provided between one end face of said projecting conductor portion and said planar conductor portion.

16. The thin-film magnetic head of claim 15, wherein said projecting conductor portion has a tubular conductor portion whose inside is occupied by said insulating material.

17. The thin-film magnetic head of claim 14, wherein said increased surface area portion is formed with said insulating material to shunt said lead conductor film.

18. The thin-film magnetic head of claim 17, wherein said lead conductor film has a planar conductor portion and a projecting conductor portion,
said projecting conductor portion projects from said planar conductor portion,
said increased surface area portion is provided between one end face of said projecting conductor portion and said planar conductor portion, and
said planar conductor portion has parallel shunts, and said increased surface area portion is formed such that an area between said parallel shunts is occupied by said insulating material.

19. The thin-film magnetic head of claim 14, wherein said thin-film element includes a coil film whose ends are each connected to said lead conductor film.

20. The thin-film magnetic head of claim 19, wherein said coil film includes a plurality of coil films separated from each other by an insulating film.

21. The thin-film magnetic head of claim 20, wherein said plurality of coil films are coplanar with said insulating film and said plurality of coil films are separated from each other by said insulating film.

22. The thin-film magnetic head of claim 20, wherein said plurality of coil films are connected in parallel with each other.

23. The thin-film magnetic head of claim 19, wherein said coil film has an increased width portion, and said increased surface area portion is formed such that said increased width portion is partially occupied by said insulating film.

24. The thin-film magnetic head of claim 14, wherein said insulating film is made of $SiO_2$.

25. The thin-film magnetic head of claim 14, wherein said insulating film is made of a material selected from the group consisting of SiC, $Si_3N_4$ and MgO.

26. The thin-film magnetic head of claim 14, wherein said thin-film element is a magneto-resistive effect film.

27. A head assembly comprising a thin-film magnetic head and a head support device, wherein said thin-film magnetic head includes a slider, at least one thin-film element and a lead conductor film, said thin-film element is an electromagnetic conversion element and supported by said slider, said thin-film element and said lead conductor film are embedded in an insulating film, said lead conductor film has a terminal area at one end thereof, is connected to said thin-film element at the other end thereof, and between said one end and said the other end, has an increased surface area portion whose volume is partially occupied by an insulating material to increase surface area, and said head support device supports said magnetic head in such a manner as to permit rolling and pitching of said magnetic head, wherein said increased surface area portion is formed with said insulating material embedded in said lead conductor film.

28. A magnetic recording/reproducing apparatus comprising a head assembly and a magnetic recording medium, wherein said head assembly includes a thin-film magnetic head and a head support device, said thin-film magnetic head includes a slider, at least one thin-film element and a lead conductor film, said thin-film element is an electromagnetic conversion element and supported by said slider, said thin-film element and said lead conductor film are embedded in an insulating film, said lead conductor film has a terminal area at one end thereof, is connected to said thin-film element at the other end thereof, and between said one end and said the other end, has an increased surface area portion whose volume is partially occupied by an insulating material to increase surface area, said head support device supports said magnetic head in such a manner as to permit rolling and pitching of said magnetic head, and said head assembly cooperates with said magnetic recording medium to record magnetic data on said magnetic recording medium or reproduce magnetic data from said magnetic recording medium, wherein said increased surface area portion is formed with said insulating material embedded in said lead conductor film.

* * * * *